United States Patent [19]

Brown

[11] Patent Number: 4,974,712

[45] Date of Patent: Dec. 4, 1990

[54] FLUID COUPLING DEVICE AND IMPROVED VALVING THEREFOR

[75] Inventor: Richard J. Brown, Marshall, Mich.

[73] Assignee: Eaton Corporation, Cleveland, Ohio

[21] Appl. No.: 406,492

[22] Filed: Sep. 13, 1989

[51] Int. Cl.[5] ............................................. F16D 35/00
[52] U.S. Cl. ................................. 192/58 B; 192/82 T; 123/41.12
[58] Field of Search ........................... 192/58 B, 82 T; 123/41.12

[56] References Cited

U.S. PATENT DOCUMENTS

| | | | |
|---|---|---|---|
| 3,227,254 | 1/1966 | Sutaruk | 192/58 B |
| 3,463,282 | 8/1969 | Fujita et al. | 192/82 T |
| 3,575,269 | 9/1969 | Sherman | 192/58 B |
| 3,943,893 | 3/1976 | Tsubaki et al. | 123/41.12 |
| 4,446,952 | 5/1984 | Masai | 192/58 B |
| 4,502,580 | 3/1985 | Clancey | 192/58 B |
| 4,618,045 | 10/1986 | Storz | 192/58 B |
| 4,627,524 | 12/1986 | Hayashi et al. | 192/58 B |

*Primary Examiner*—Rodney H. Bonck
*Assistant Examiner*—Nicholas Whitelaw
*Attorney, Agent, or Firm*—L. J. Kasper

[57] ABSTRACT

A fluid coupling device is disclosed of the type including a valve plate (31) separating the fluid chamber into an operating chamber (33) and a reservoir chamber (35). The valve plate defines first and second fill openings (43a, 43b), flow through which is controlled by a valve member (41) which rotates in the plane of the valve plate in response to variations in temperature. The first (43a) and second (43b) fill openings are disposed in generally the same region of the valve plate (31). The valve member (41) includes first (41a) and second (41b) port covering portions, disposed to cover the fill openings, when the valve member is in a disengaged condition, and to uncover the openings as the valve member moves toward an engaged condition. Having the fill openings in the same region of the valve plate substantially reduces the negative effects of errors in the concentricities of the valve arm, valve plate and the various parts of the device.

11 Claims, 6 Drawing Sheets

FLUID COUPLING DEVICE AND IMPROVED VALVING THEREFOR

BACKGROUND OF THE DISCLOSURE

The present invention relates to fluid coupling devices of the type including valve means operable to control the quantity of fluid in the fluid operating chamber, and more particularly, to such devices of the type including a valve element which is actuated to rotate in a plane parallel to a member which defines a fill opening.

Although the present invention may be used advantageously in fluid coupling devices having various configurations and applications, it is especially advantageous in a coupling device of the type used to drive a radiator cooling fan of an internal combustion engine, and will be described in connection therewith.

Fluid coupling devices of the viscous shear type have been popular for many years for driving engine cooling fans, primarily because their use results in a substantial saving of engine horsepower, resulting from the fact that the coupling operates in the engaged condition only when cooling is needed, and operates in a disengaged, relatively lower speed condition when little or no cooling is required. The change between the engaged and the disengaged conditions occurs in response to the sensing of ambient air temperature by a bimetal coil, which rotates the valve member to either cover or uncover the fill opening, thus controlling the flow of viscous fluid from a reservoir chamber into an operating chamber In fluid coupling devices of the type to which the present invention relates, the quantity of fluid in the operating chamber is controlled indirectly, i.e., the angular position of the valve arm controls the radially outermost point of overlap between the valve arm and the fill opening, thus controlling the radial dimension of the fluid meniscus contained in the reservoir chamber, which determines the volume of fluid in the operating chamber.

In a number of relatively high-torque coupling devices, in order to obtain the desired relationship between the fluid fill rate and changes in temperature, it has been necessary to provide a pair of fill openings. Typically, when there is a pair of fill openings, they are identical in size, shape, and location (i.e., relative to the axis of rotation of the device), although such identity of the fill ports is not an essential feature of the present invention. It has also been typical for such a pair of fill ports to be oppositely disposed (i.e., 180 degrees apart), about the axis of rotation of the device. Such an arrangement has been conventional for a number of reasons, including uniform distribution of fluid entering the operating chamber, as well as the ability to use a simple, rectangular valve arm configuration.

One of the problems associated with dual fill port devices is the difficulty of assembling and calibrating the cover and valve subassembly. The term "calibration" as used herein refers to achieving the proper position of the valve arm, relative to the fill ports, for any particular temperature condition. This is typically accomplished by means of a water bath calibration in which the cover subassembly is placed such that the bimetal element is in a water bath of a known temperature, and the valve plate (which defines the fill openings) is rotated to a position in which the edge of the valve arm is aligned with a calibration mark on the valve plate. Ideally, if the fill openings are identical, the relative position of each fill opening and the valve arm should be identical, which should occur if all of the various parts involved are machined accurately and are concentric relative to each other. However, such is frequently not the case, and if the operator makes the proper calibration at one fill opening, the other fill opening and the valve arm are in a substantially different relationship. The operator may then either leave the valve plate in that position, or move the valve plate to a position in which the valve arm will be offset from the calibration mark, such that the amount of offset at the two fill openings will be about the same. In either case, the result will be an incorrect relationship between ambient temperature and the position of the valve arm relative to the fill openings. Depending upon the direction of the error, this may, in turn, result in the coupling device engaging at too low a temperature, thus wasting engine horsepower and creating excessive noise, or may result in engagement at too high a temperature, with the attendant possibility of the engine overheating.

SUMMARY OF THE INVENTION

Accordingly, it is an object of the present invention to provide an improved dual fill opening fluid coupling device in which the ability of the valving to be properly calibrated is not as seriously affected by errors in the concentricities of the various parts of the device.

It is a related object of the present invention to provide such an improved coupling device which eliminates a substantial amount of the subjective judgment which the calibration operator has had to exercise in setting the prior art device.

The above and other objects of the present invention are accomplished by the provision of an improved fluid coupling device of the type including a first rotatable coupling member defining an axis of rotation, enclosure means associated with the first coupling member to define a fluid chamber therebetween, and valve means associated with the first coupling member to separate the chamber into a fluid operating chamber and a fluid reservoir chamber. A second rotatable coupling member is disposed in the fluid operating chamber and is rotatable relative to the first member, either the first coupling member or the enclosure means cooperating with the second coupling member to define a viscous shear space therebetween. The valve means is operative to control the flow of fluid from the reservoir chamber to the operating chamber and includes control means associated with the valve means to effect the operation thereof in response to variations in a predetermined condition. The device includes means operable to pump fluid from the operating chamber into the reservoir chamber in response to a difference in speed of rotation of the coupling members. The valve means includes a plate-like member defining first and second fluid inlet ports disposed to permit fluid flow from the reservoir chamber into the operating chamber. The valve means further includes a movable valve member operably associated with the control means and with the fluid inlet ports to control the flow of fluid through the ports in response to variations in the predetermined condition. The valve member comprises a generally flat member disposed to move in a plane generally parallel to the plate-like member, and closely spaced thereto.

The improved device is characterized by the first and second fluid inlet ports being disposed generally in the same region of the plate-like member. The valve member includes first and second port covering portions disposed to cover the first and second fluid inlet ports, respectively, when the valve member is in a disengaged condition, and to uncover the ports as the valve member moves toward an engaged condition.

DESCRIPTION OF THE PREFERRED EMBODIMENT

Figure 1:
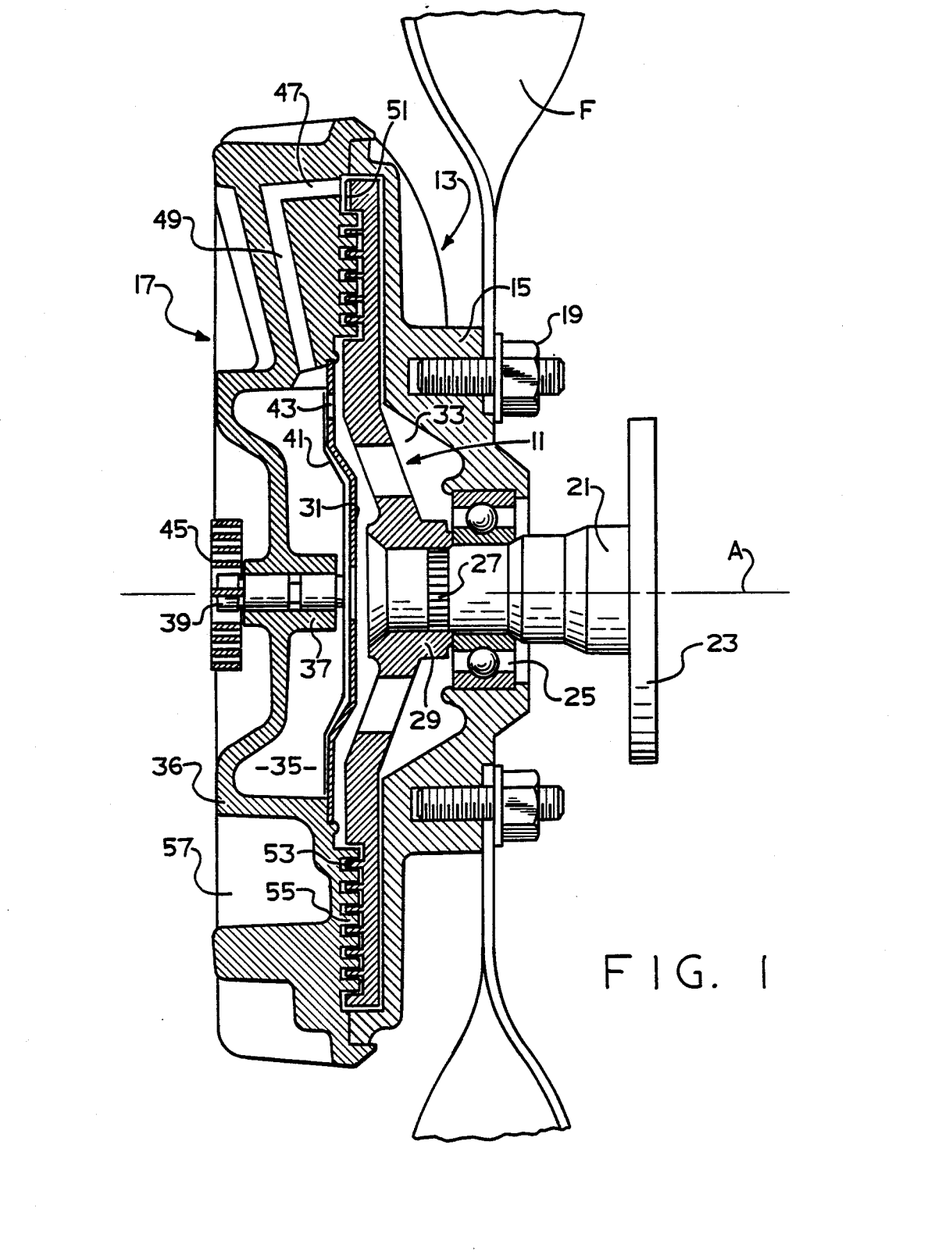
FIG. 1 is an axial cross-section of a typical fluid coupling device of the type with which the present invention may be utilized.

Referring now to the drawings, which are not intended to limit the invention, FIG. 1 illustrates one preferred form of a fluid coupling device (viscous fan drive) of the type with which the present invention may be utilized. The fluid coupling device illustrated in FIG. 1 includes an input coupling member, generally designated 11, and an output coupling assembly, generally designated 13. The output coupling assembly 13 includes a die cast housing member 15 and a die cast cover member 17, the members 15 and 17 being secured together by a rollover of the outer periphery of the cover member 17, as is well known in the art. The fluid coupling device is adapted to be driven by a liquid cooled engine and, in turn, drives a radiator cooling fan F. The fan F may be attached to the housing member 15 by means of a plurality of nuts 19. It will be understood, however, that the use of the present invention is not limited to any particular configuration of fluid coupling device or any particular application thereof, except as specifically noted hereinafter.

The fluid coupling device includes an input shaft 21 on which the input coupling member 11 is mounted. The input shaft 21 is rotatably driven, typically by means of a flange 23 which may be bolted to the mating flange of an engine water pump. The input shaft 21 functions as a support for the inner race of a bearing set 25, which is seated on the inside diameter of the housing member 15. The forward end (left end in FIG. 1) of the input shaft 21 has an interference fit between a serrated portion 27 and an opening defined by a hub portion 29 of the input coupling member 11. As a result, rotation of the input shaft 21 causes rotation of the input coupling member 11.

The housing member 15 and the cover member 17 cooperate to define a fluid chamber which is separated, by means of a circular valve plate 31, into a fluid operating chamber 33 and a fluid reservoir chamber 35. Thus, it may be seen that the input coupling member 11 is disposed within the fluid operating chamber 33.

The cover member 17 defines a raised, annular reservoir-defining portion 36, which is disposed to be generally concentric about an axis of rotation A of the device, and further defines a generally cylindrical shaft support portion 37, and rotatably disposed within the portion 37 is a valve shaft 39 extending outwardly (to the left in FIG. 1) through the cover member 17. Attached to the inner end (right end in FIG. 1) of the valve shaft 39 is a valve arm 41, which may be better understood by reference to U.S. Pat. No. 3,055,473, assigned to the assignee of the present invention and incorporated herein by reference. Movement of the valve arm 41 controls the flow of fluid from the reservoir chamber 35 to the operating chamber 33, through a fill opening 43 formed in the valve plate 31.

Operatively associated with the outer end of the valve shaft 39 is a temperature-responsive bimetal element, comprising a coil member 45, which includes an inner end portion in engagement with the valve shaft 39. The manner in which the bimetal coil member 45 operates to control the movement of the valve arm 41, in response to variations in a predetermined temperature condition, is well known in the art, is not an essential feature of the present invention, and will not be described further herein.

The cover member 17 defines an axial passage 47 in communication with the fluid operating chamber 33, and a generally radial passage 49 which provides fluid communication from the axial passage 47 to the fluid reservoir chamber 35. Disposed adjacent the axial passage 47 is a pumping element (wiper) 51, operable to engage the relatively rotating fluid in the operating chamber 33 to generate a localized region of relatively higher fluid pressure, and continually pump a small quantity of fluid back into the reservoir chamber 35, through the passages 47 and 49, as is well known in the art.

In the subject embodiment of the invention, the input coupling member 11 includes a forward surface which defines a plurality of annular lands 53. The adjacent surface of the housing member 17 forms a plurality of annular lands 55. The annular lands 53 and 55 are interdigitated to define a serpentine-shaped viscous shear space therebetween. It is believed that in view of above-incorporated U.S. Pat. No. 3,055,473, those skilled in the art can fully understand the construction and operation of the fluid coupling device illustrated in FIG. 1, as well as the various flow paths for the viscous fluid contained therein. When torque is transmitted from the vehicle engine by means of the input shaft 21 to the input coupling member 11, the result is a shearing of the viscous fluid contained in the shear space between the annular lands 53 and 55.

Figure 2:
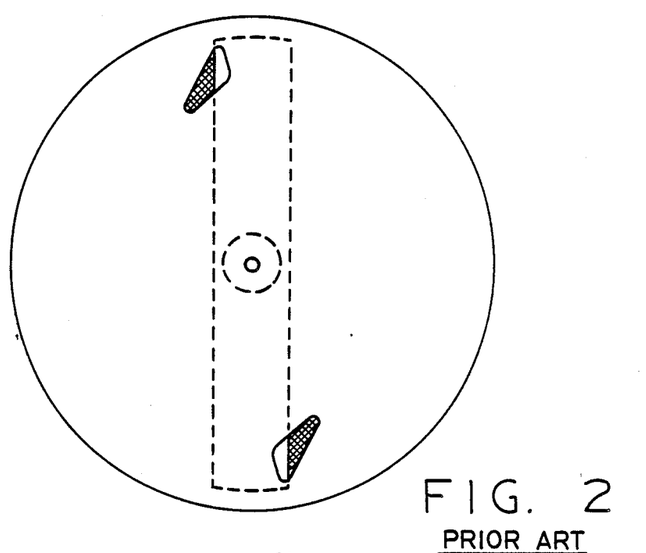
FIG. 2 is a rear plan view of the prior art valve plate and valve arm subassembly.

Referring now to FIG. 2, there is illustrated a typical prior art valve plate and valve arm subassembly, wherein the valve plate defines a pair of fill openings, disposed diametrically opposite each other. As was discussed in the background of the specification, it is frequently necessary to provide a pair of fill openings, in order to provide sufficient flow capacity from the reservoir chamber 35 into the operating chamber 33. As is understood by those skilled in the art, it is not possible to achieve the desired operating characteristics of the fluid coupling device by simply providing one larger fill opening. Furthermore, the radial extent of the fill opening, uncovered by the valve arm, must correspond to the radial dimension of the fluid meniscus in the reservoir chamber 35.

Figure 3:
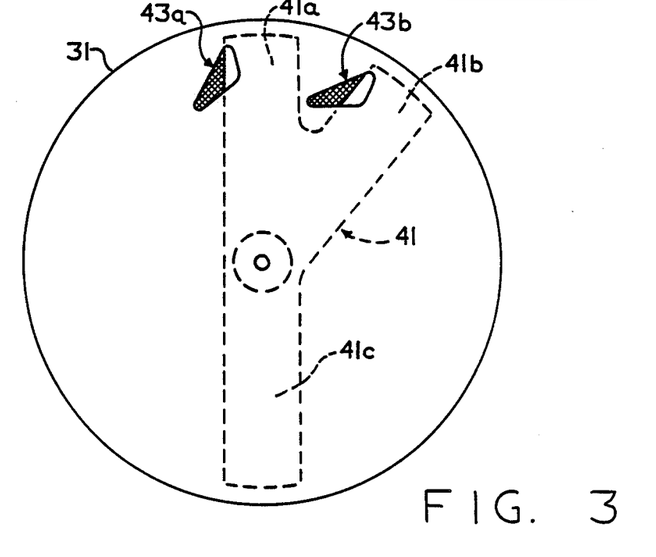
FIG. 3 is a rear plan view, similar to FIG. 2, showing the valve plate and valve arm subassembly, in accordance with the present invention.

Referring now to FIG. 3, there is illustrated the improved valve plate and valve arm subassembly in accordance with the present invention. The subassembly includes the valve plate 31 defining a pair of fill openings 43a and 43b. The valve arm, still generally designated 41, is generally Y-shaped, including a pair of port covering portions 41a and 41b, disposed to cover and uncover fill openings 43a and 43b, respectively. The valve arm 41 also includes an arm portion 41c, one function of which is to engage one or more stops or limits, of the type which are well known in the art, form no part of this invention, and are not discussed herein. It may be seen that one important aspect of the present invention is that the fill openings 43a and 43b be disposed generally in the same region of the valve plate 31.

Figure 4:
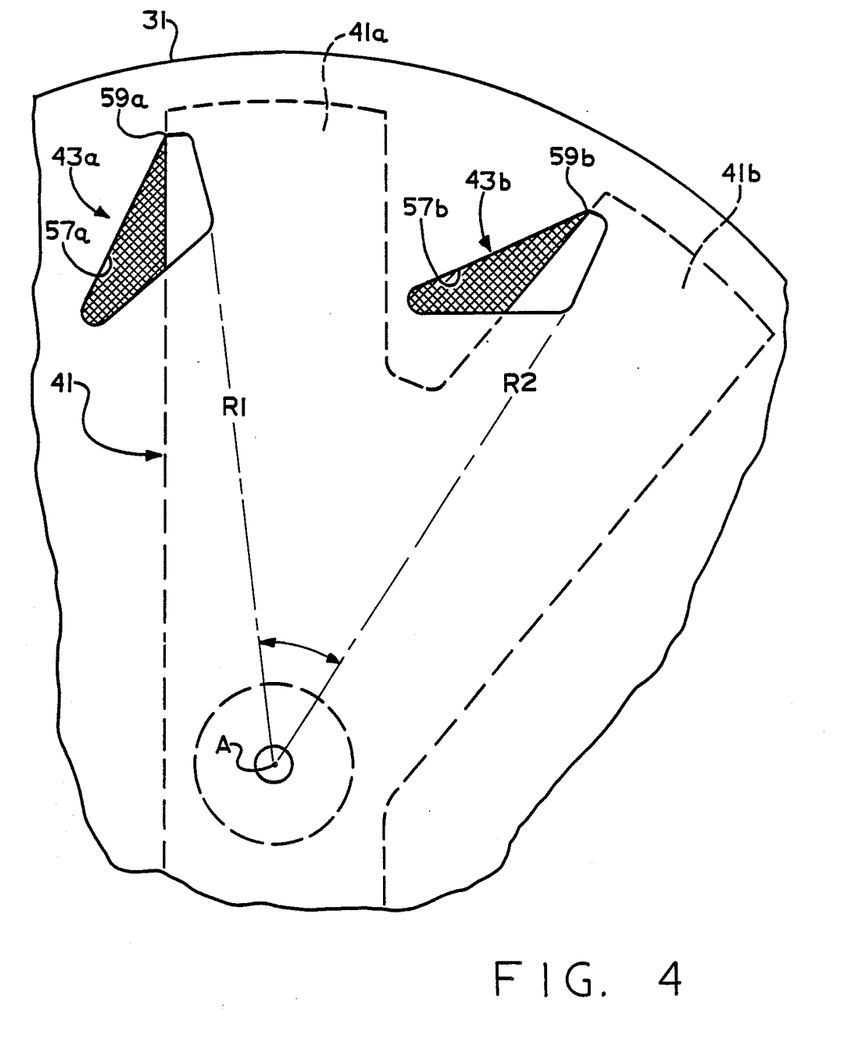
FIG. 4 is an enlarged, fragmentary view, similar to FIG. 3.

It may be seen in FIG. 4 that the fill opening 43a is disposed on a radial line R1, and the fill opening 43b is disposed on a radial line R2. Preferably, the radial lines R1 and R2, and therefore the fill openings 43a and 43b, are disposed within about 60 degrees of each other, and in the subject embodiment, the angle between the lines R1 and R2 is approximately 40 degrees. It will be understood from the subsequent description that the benefit derived from the use of the present invention is greater as the fill openings 43a and 43b are disposed closer to each other, although it is also recognized that there is a practical limit on how close together the fill openings can be located.

Referring still to FIG. 4, the fill openings 43a and 43b include angled outer surfaces 57a and 57b, respectively. As the valve arm 41 moves in a clockwise direction in FIG. 4 from its position in which the covering portions 41a and 41b completely cover the fill openings 43a and 43b, respectively, the result is an uncovered flow area (cross-hatched in each of FIGS. 2–10). For any given angular position of the valve arm 41, the covering portion 41a or 41b intersects the outer surface 57a or 57b, respectively, to define a radially outermost point 59a or 59b of the uncovered flow area. In the subject embodiment, with the fill openings 43a and 43b being identical, it is intended that, for any given angular position of the valve arm 41, the location of the outermost point 59a, relative to the fill opening 43a, should be identical to the location of the outermost point 59b, relative to the fill opening 43b.

It should be understood by those skilled in the art that it is not an essential feature of the present invention for the different fill openings to be identical in size, shape, or location. However, in order to facilitate explanation of the benefits of the present invention, and in order to compare the present invention to the prior art, the subject embodiment is illustrated with the fill openings 43a and 43b being identical in size (flow area), shape, and location (i.e., relative to the axis of rotation A).

Figure 5:
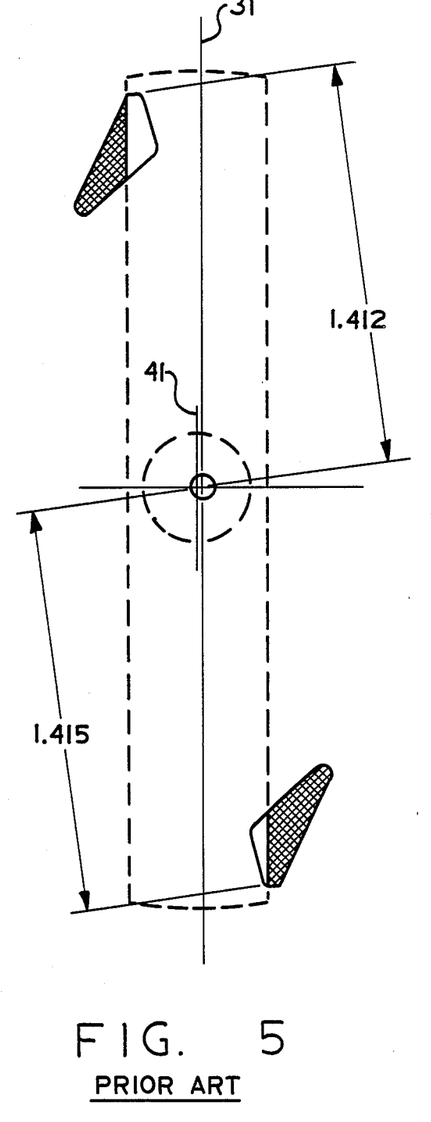
FIGS. 5 and 6 are views similar to FIG. 2, illustrating the effect of an offset of the prior art valve arm, to the left and to the right, respectively.
Figure 6:
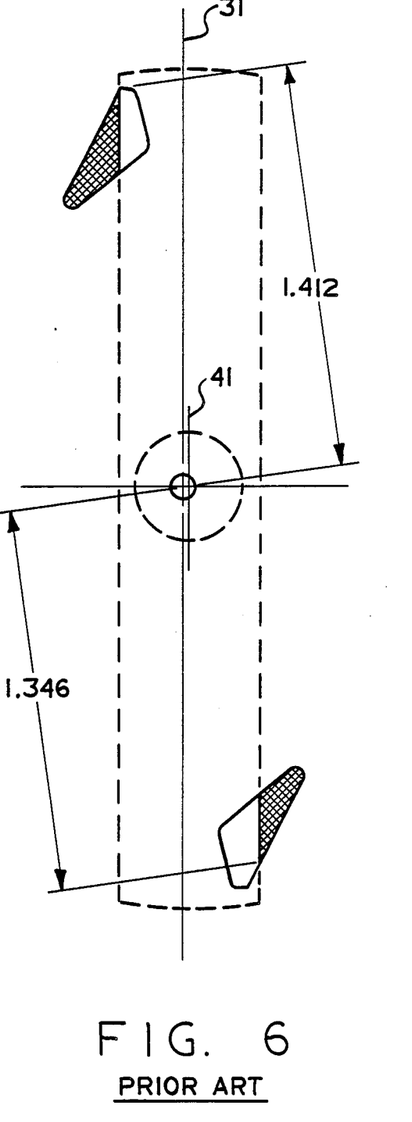

Referring now to FIGS. 5 and 6, the advantages of the valve configuration of the present invention will be described by first describing the process for calibrating the prior art valve plate and valve arm subassembly. The calibration process begins with the entire cover subassembly positioned "face down", i.e., with the bimetal coil 45 located in a water bath. The temperature of the water in the water bath may be selected and controlled to represent a particular calibration temperature of the fluid coupling device, i.e., a temperature of ambient air surrounding the bimetal coil 45 which causes the valve arm to be at a predetermined location relative to the fill openings.

At this point in the calibration process, the valve plate 31 is still free to rotate relative to the cover member 17, i.e., the valve plate 31 has not yet been permanently attached or fixed relative to the cover member 17. The calibration operator then rotates the valve plate 31 to a position in which the relationship of the valve arm to the fill openings corresponds to the temperature of the water bath. For example, if the water bath temperature is equal to the cut-in temperature, the valve plate 31 would be rotated to a position in which the valve arm is just coincident with a calibration mark (not shown). Once the calibration operator has properly positioned the valve plate 31, relative to the cover member 17, the valve plate 31 is then permanently secured to the cover member 17 by any suitable means, such as deformation of a rollover portion.

The above-described calibration process has achieved generally satisfactory results, whenever the various concentricities involved are maintained within very tight tolerances. Among the "concentricities" which affect the calibration process are the following:

(1) the concentricity of the recess in the cover member 17 which receives the valve plate 31, to the axis A;
(2) the diameter of the valve plate 31;
(3) the location of the fill ports relative to the center of the valve plate 31, and relative to the axis of rotation A;
(4) the width of the valve arm; and
(5) the relationship of each side of the valve arm to the axis of the valve arm.

Referring now to FIGS. 5 and 6, the effect of such concentricity errors on the calibration process will be described in greater detail. In FIGS. 5 through 10, the various flow areas and dimensions were determined by means of a standard, commercially available computer-aided-design software package. For purposes of subsequent explanation, it will be assumed that the "tolerance stack" of all the various sources of concentricity error described above result in a net shift of the prior art valve arm 0.020 in. to the left, relative to the valve plate (FIG. 5), or a net shift of 0.020 in. to the right, relative to the valve plate (FIG. 6). Although, in theory, the calibration operator rotates the valve plate until the valve arm is in the desired position with regard to both fill openings, as a practical matter, if the valve arm is not concentric relative to the fill openings, the operator will likely rotate the valve plate to obtain the desired relationship between one of the fill openings and the valve arm, resulting in an erroneous relationship between the other fill opening in the valve arm.

Referring still to FIGS. 5 and 6, it should be understood that the present invention is concerned with trying to reduce three types of fill opening error, as follows:

(1) the uncovered flow area;
(2) the radial distance from the axis of rotation A to the radially outermost point of the uncovered flow area; and
(3) the "phase" error, i.e., the error perceived by the operator in the location of the valve arm, relative to the desired calibration point.

In FIG. 5, with the valve arm offset 0.020 in. to the left, the operator would adjust the valve plate so that the valve arm is aligned with the calibration mark, in this case, the upper lefthand corner of the upper fill opening. Referring now also to the Table included below, it should be noted that the nominal, uncovered flow area of each fill opening is 0.0345 sq. in., and in the upper port in FIG. 5, because of the slight angle of the valve arm, the area of the upper port is only 0.0339 sq. in. However, the area of the lower port is increased to 0.0453 sq. in., and the total uncovered flow area is 0.0792 sq. in., an increase of 14.8% over the nominal, total area of 0.0690 sq. in. The nominal radial dimension to the radially outermost point of the uncovered flow area is 1.412 in., and the offset of the valve arm results in an increase in the radial dimension for the lower port of 0.003. Finally, the phase error at the lower port is 0.040 in., shifted to the left of the desired calibration point.

Referring now to FIG. 6, with the valve arm offset 0.020 in. to the right, the valve plate must be rotated clockwise in order to have the valve arm coincide with the calibration point at the upper port. This results in a slight increase in flow area of the upper port, to 0.0352 sq. in., but a substantial decrease in flow area for the lower port, to 0.0244 sq. in., such that the total flow area of 0.0596 sq. in. represents a 13.6% decrease in flow area, as compared to the nominal flow area of 0.0690 sq. in. At the same time, the radial dimension for the lower port is decreased from the nominal of 1.412 in. to 1.346 in., a decrease of 0.066 in. Finally, the resulting phase error is again 0.040 in., but in FIG. 6, the error is to the right of the calibration mark.

INVENTION

Figure 7:
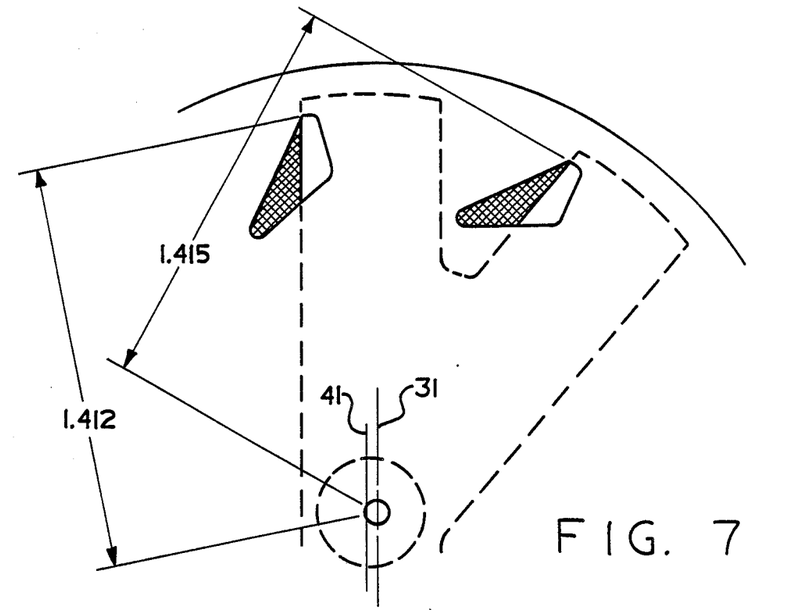
FIGS. 7-10 are views similar to FIG. 3, illustrating the effect of offsets of the valve arm of the invention, to the left, to the right, upward, and downward, respectively.

Referring now to FIGS. 7–10, and still referring to the Table, the improvements resulting from the use of the present invention will be described. Referring first to FIG. 7, with calibration taking place at the left port, an offset of the valve arm of 0.020 in. to the left in FIG. 7 decreases the flow area of the left port to 0.0339 sq. in., but results in an increase in flow area of the right port to only 0.0406 sq. in., such that the total flow area is 0.0745 sq. in., an increase of only 8.0% above the nominal. The change in the radial dimension for the right port is 0.003 in. Finally, the phase error, as seen by the calibration operator, is only 0.005 in., and to the right in FIG. 7.

Figure 8:
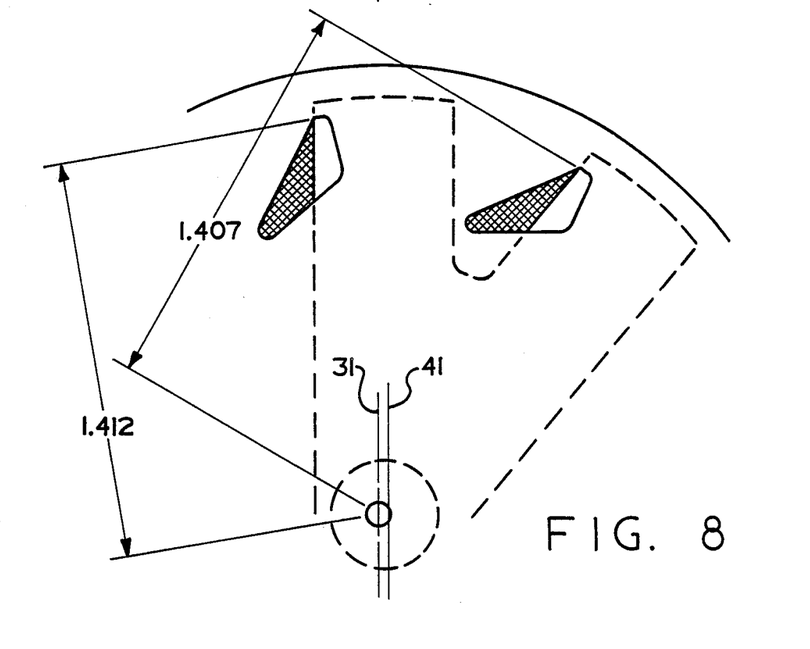

Referring now to FIG. 8, the valve arm has been offset, 0.020 in. to the right, and then the valve plate rotated to achieve calibration at the left port which, referring to the Table, increases in flow area to 0.0352 sq. in., slightly above the nominal, while the right port decreases slightly to 0.0338 sq. in., with the total flow area being 0.0690 sq. in., exactly equal to the nominal flow area. For the right port, the radial dimension is reduced slightly to 1.407 in., a reduction of 0.005 in. from the nominal, and finally, the phase error is again 0.005 in., but to the left.

Figure 9:
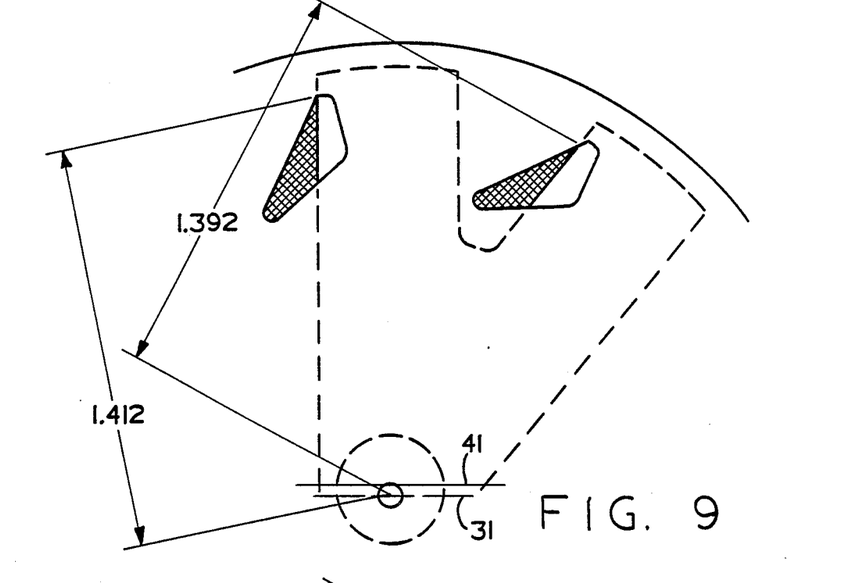

Referring now to FIG. 9, the valve arm is offset upward 0.020 in., relative to the valve plate. It should be noted that, in connection with the prior art, no upward or downward offset was described, because such offsets of the prior art valve arm would not effect any of the types of error being discussed herein. In FIG. 9, the left port remains at the nominal flow area of 0.0345 sq. in., but the right port is reduced to 0.0308 sq. in., such that the total flow area is reduced to 0.0653 sq. in., a reduction of 5.3% from the nominal. The upward offset in FIG. 9 results in a decrease in the radial dimension for the right port to 1.392 in., a reduction of 0.020 in. from the nominal. Finally, the phase error is 0.013 in. to the left in FIG. 9.

Figure 10:
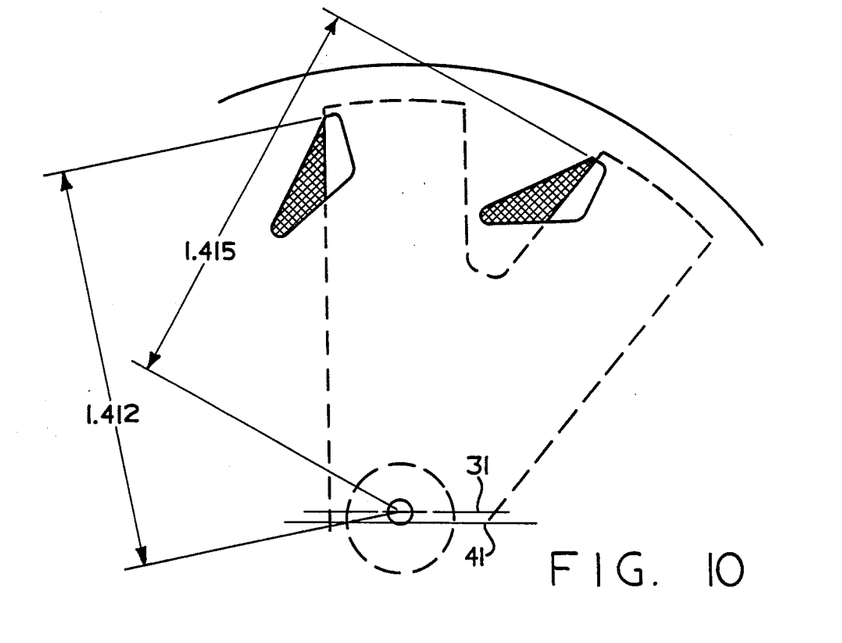

Referring now to FIG. 10, an offset of the valve arm downward 0.020 in. relative to the valve plate again leaves the left port flow area unchanged at 0.0345 sq. in., but increases the right port area to 0.0383 sq. in., such that the total flow area increases to 0.0728 sq. in., an increase of 5.5% above nominal. As was the case with the left offset of FIG. 7, the downward offset in FIG. 10 results in an increase in the radial dimension of the right port to 1.415 in., an increase of 0.003 in. Finally, the downward offset again results in a phase error of 0.013 in., but in the case of the downward offset of FIG. 10, the phase error is to the right.

It will be understood by those skilled in the art that, in actual production, the net effect of various concentricity errors will not be an offset of the valve arm purely in one direction, but will result in an offset which is some combination, for example, an offset upward to the left. However, in order to simplify the foregoing analysis, the effects of offset in the various directions was isolated.

In summary, the present invention provides a valve arm which, for any particular offset due to concentricity error, is likely to have a smaller percentage change of uncovered flow area; is likely to have a more constant radial dimension; and will present the calibration operator with a substantially reduced visual phase error.

The invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

TABLE

| | PRIOR ART | | INVENTION | | | |
|---|---|---|---|---|---|---|
| | FIG. 5 | FIG. 6 | FIG. 7 | FIG. 8 | FIG. 9 | FIG. 10 |
| OFFSET DIRECTION .020 IN. | | | | | | |
| UPPER/LEFT PORT | .0339 | .0352 | .0339 | .0352 | .0345 | .0345 |
| LOWER/RIGHT PORT | .0453 | .0244 | .0406 | .0338 | .0308 | .0383 |
| UNCOVERED FLOW AREA | | | | | | |
| TOTAL AREA | .0792 | .0596 | .0745 | .0690 | .0653 | .0728 |
| % CHANGE | +14.8 | −13.6 | +8.0 | 0 | −5.3 | +5.5 |
| RADIAL ERROR LOWER/RIGHT PORT | +.003 | −.066 | +.003 | −.005 | −.020 | +.003 |
| PHASE ERROR (LOWER/RIGHT PORT) | .040 | .040 | .005 | .005 | .013 | .013 |

I claim:

1. A fluid coupling device of the type including a first rotatable coupling member defining an axis of rotation (A), enclosure means associated with said first coupling member to define a fluid chamber therebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member, one of said first coupling member and said enclosure means cooperating with said second coupling member to define a viscous shear space therebetween, said valve means being operative to control the flow of fluid between said reservoir chamber and said operating chamber, and having control means associated with said valve means to effect the operation thereof in response to variations in a predetermined condition; means operable to pump fluid from said operating chamber into said reservoir chamber in response to a difference in speed of rotation of said first and second coupling members; said valve means including a plate-like member defining first and second fluid inlet ports disposed to permit fluid flow from said reservoir chamber into said operating chamber, said valve means further including a movable valve member operably associated with said control means, and with said fluid inlet ports to control the flow of fluid through said ports in response to variations in said predetermined condition, said valve member comprising a generally flat member disposed to move in a plane generally parallel to said plate-like member, and closely spaced thereto, characterized by:
    (a) said first and second fluid inlet ports being disposed at substantially the same distance from said axis of rotation (A), and being disposed generally on first and second radial lines, respectively, relative to said axis of rotation (A), said first and second radial lines being disposed within about 60 degrees of each other,
    (b) said valve member including first and second port covering portions, disposed to cover said first and second fluid inlet ports, respectively, when said valve member is in a disengaged condition, and to uncover said ports as said valve member moves toward an engaged condition.

2. A fluid coupling device as claimed in claim 1 characterized by said fluid inlet ports being substantially identical to each other in configuration and flow area, the uncovered flow area of said first and second fluid inlet ports being substantially identical for any position of said valve member.

3. A fluid coupling device as claimed in claim 1 characterized by said fluid inlet ports being disposed radially inwardly from at least a major portion of said viscous shear space.

4. A fluid coupling device as claimed in claim 1 characterized by said valve member comprising a generally Y-shaped member having a pair of outwardly-extending arm portions, said first and second port covering portions comprising said pair of upwardly-extending arm portions.

5. A fluid coupling device as claimed in claim 1 characterized by said first and second radial lines being disposed within about 40 degrees of each other.

6. A fluid coupling device as claimed in claim 1 characterized by said control means to effect the operation of said valve means comprising a temperature-responsive bimetallic element, and said predetermined condition comprises the temperature of the air in the region of said fluid coupling device.

7. A fluid coupling device as claimed in claim 1 characterized by said first and second fluid inlet ports including outer surfaces oriented at an angle whereby the radially outermost points of said uncovered flow area move radially outward as said valve member moves from said disengaged condition to said engaged condition.

8. A fluid coupling device of the type including a first rotatable coupling member defining an axis of rotation (A), enclosure means associated with said first coupling member to define a fluid chamber therebetween; valve means associated with said first coupling member and disposed to separate said fluid chamber into a fluid operating chamber and a fluid reservoir chamber; a second rotatable coupling member disposed in said fluid operating chamber and being rotatable relative to said first coupling member, one of said first coupling member and said enclosure means cooperating with said second coupling member to define a viscous shear space therebetween, said valve means being operative to control the flow of fluid between said reservoir chamber and said operating chamber, and having control means associated with said valve means to effect the operation thereof in response to variations in a predetermined condition; means operable to pump fluid from said operating chamber into said reservoir chamber in response to a difference in speed of rotation of said first and second coupling members; said valve means including a plate-like member defining first and second fluid inlet ports disposed to permit fluid flow from said reservoir chamber into said operating chamber, said valve means further including a movable valve member operably associated with said control means, and with said fluid inlet ports to control the flow of fluid through said ports in response to variations in said predetermined condition, said valve member comprising a generally flat member disposed to move in a plane generally parallel to said plate-like member, and closely-spaced thereto, characterized by:
    (a) said first and second fluid inlet ports being disposed generally in the same region of said plate-like member; and
    (b) said valve member comprising a generally Y-shaped member having a pair of outwardly-extending arm portions, disposed to cover said first and second fluid inlet ports, respectively, when said valve member is in a disengaged condition, and to uncover said ports as said valve member moves toward an engaged condition.

9. A fluid coupling device as claimed in claim 8 characterized by said fluid inlet ports being disposed radially inwardly from at least a major portion of said viscous shear space.

10. A fluid coupling device as claimed in claim 8 characterized by said first and second fluid inlet ports being disposed on first and second radial lines, respectively, relative to said axis of rotation (A), said first and second radial lines being disposed within about 60 degrees of each other.

11. A fluid coupling device as claimed in claim 10 characterized by said first and second radial lines being disposed within about 40 degrees of each other.

* * * * *